United States Patent [19]
West

[11] 3,787,695
[45] Jan. 22, 1974

[54] SAMPLE IDENTIFICATION BY MEASUREMENT OF WAVELENGTH OF LUMINESCENCE UTILIZING PLASMA DISCHARGE LAMP EXCITATION AND CONTINUOUS INTERFERENCE FILTER

[75] Inventor: Michael Anthony West, Orpington, England

[73] Assignee: The Royal Institution of Great Britain, London, England

[22] Filed: Sept. 15, 1971

[21] Appl. No.: 180,628

[30] Foreign Application Priority Data
Sept. 17, 1970 Great Britain .................. 44524/70

[52] U.S. Cl. ................ 250/365, 250/301, 250/504, 350/314
[51] Int. Cl. ............................................. G01n 23/00
[58] Field of Search.... 250/71 G, 77, 83.3 UV, 365, 250/301, 504; 350/314, 318

[56] References Cited
UNITED STATES PATENTS

| | | |
|---|---|---|
| 2,590,080 | 3/1952 | Adams .......................... 350/314 X |
| 3,205,767 | 9/1965 | Weber et al. .................... 350/314 X |
| 3,666,945 | 5/1972 | Frungel et al. ........... 250/83.3 UV X |
| R25,320 | 1/1963 | Lewis et al. ................... 250/71 G X |
| 3,433,952 | 3/1969 | Howerton ......................... 250/77 X |
| 3,449,571 | 6/1969 | Hoerman et al. ................. 250/71 G |
| 3,497,690 | 2/1970 | Wheeless, Jr. et al.. 250/83.3 UV X |

Primary Examiner—Archie R. Borchelt
Attorney, Agent, or Firm—Peter H. Smolka et al.

[57] ABSTRACT

In an apparatus for detecting the intensity of luminescence at various wavelengths emitted by a sample under test, the sample is excited by light from a plasma discharge flash lamp coupled to an electrical supply circuit including means for storing electrical energy and repeatedly discharging rapidly the stored energy to produce flashes of high peak intensity over a continuous range of wavelengths in the exciting wavelength region. A continuous interference filter is movable across the path of luminescence from the sample to a detector for analysing the wavelength of luminescence emittal.

10 Claims, 6 Drawing Figures

RECORDER

SAMPLE IDENTIFICATION BY MEASUREMENT OF WAVELENGTH OF LUMINESCENCE UTILIZING PLASMA DISCHARGE LAMP EXCITATION AND CONTINUOUS INTERFERENCE FILTER

BACKGROUND OF THE INVENTION

This invention relates to apparatus for detecting in terms of wavelength the luminescence emitted by sample specimens, including the measurement of fluorescence in all sample phases or phosphorescence in solid sample phases.

In known apparatus for measuring fluorescence in samples of materials under test, the light sources used for exciting the samples have included quartz iodine direct current filament lamps. However these lamps lack the light intensity required in the ultra violet region for excitation in modern analysis of samples of materials. Low pressure gas discharge lamps have been used but these are characterised by a line spectrum which is generally unsuitable for exciting unknown samples. Arc lamps have a continuous spectrum and provide sufficient intensity in the ultra violet region but they are expensive, and occupy a large space. Known apparatus may incorporate broad band colour filters through which the light from the illuminated specimen passes, but they only give an indication of the amount of light emitted over a wide spectral range by the sample specimens of materials and do not give the spectral resolution required. Monochromators have been used to achieve the required resolution but they are large and expensive.

The main object of the present invention is to provide apparatus for analysing samples of materials in which the aforesaid disadvantages of insensitivity and lack of spectral resolution are minimised or eliminated.

SUMMARY OF THE INVENTION

The present invention provides apparatus for detecting the intensity of luminescence at various wavelengths emitted by a sample under test, comprising a support for a sample under test, a plasma discharge flash lamp coupled to an electrical supply circuit including means for storing electrical energy and repeatedly discharging rapidly the stored energy to produce flashes of high peak intensity over a continuous range of wavelengths in a required wave length region, means for confining a beam of light from the lamp towards the sample under test, a light detector arranged to detect luminescence emitted from the sample and not the rays illuminating the sample and provide an electrical output signal dependent on the intensity of luminescence detected, and a continuous interference filter device located between the light detector and the sample, together with means for restricting the path width of luminescence incident on the filter, the filter device being movable across the path of luminescence so as to vary the wavelength which may be transmitted from the sample to the detector.

By plasma discharge flash lamp is meant a lamp having an envelope at least part of which is transparent, containing the gas through which the discharge occurs to produce the flash. The plasma discharge lamp is constituted and operationally arranged for energisation by the sudden release of high peak electrical energy, the object being to elevate the temperature of the plasma to a level at which high peak light flashes having a substantially continuous spectrum are generated.

It is necessary for the lamp to provide a substantial output intensity over a continuous range of wavelengths in an appropriate spectral region. When an unknown sample is tested in an apparatus embodying the present invention, the necessary wavelength needed to excite the sample will not be known in advance and consequently it is necessary for the lamp to emit a continuous spectrum rather than a line spectrum, covering a range of wavelengths within which the unknown excitation wavelength or wavelengths, is or are likely to lie.

A particularly suitable excitation range is 200 nanometers to 400 nanometers.

DESCRIPTION OF THE PREFERRED EMBODIMENT

Figure 1:
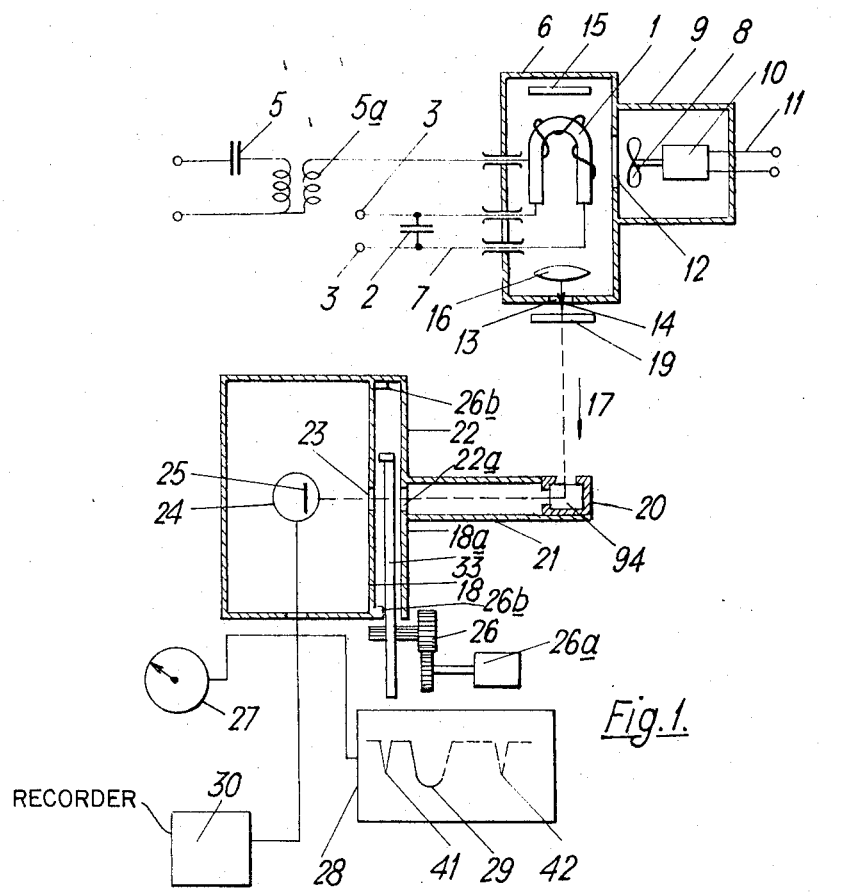
FIG. 1 shows diagrammatically an apparatus for use in measuring in terms of wavelength the colour of a test specimen extressing the measuring by three possible devices, namely, a meter, a chart recorder and an oscillograph.

Referring to the drawings, the apparatus of FIG. 1 has a gas filled plasma discharge flash lamp 1 of conventional construction energised by pulsed direct electric current through a capacitor 2 connected to terminals 3. The lamp may be filled with an inert gas, e.g., xenon, argon or krypton, or a mixture of inert and other gas, e.g., hydrogen. The lamp 1 is shown as U-shape but it may be a single turn coil tube or have several coils or be of other suitable construction, the lamp being operated by discharge of electricity stored in the capacitor 2 which is rapidly recharged from a D.C. power supply, the frequency of the lamp flashes depending on the supply of electronic pulses to a capacitor 5 through a trigger coil 4 to trigger the lamp. The direct current supply can be of any conventional type.

The lamp 1 is housed in a casing 6 through which the current leads 7 pass through grommets or like means which do not permit light to pass. The lamp casing is cooled by a conventional fan 8 in a housing 9 driven for example by an electric motor 10 supplied by current through leads 11.

The housing 6 has an inlet opening 12 from the fan 8 and an outlet or outlets for the circulating air may be slits (not shown) in the housing in the conventional manner. The housing 6 has an aperture 13, of any shape but preferably a vertical slit three-fourths inch wide and 1½ to 2 inches high through which a beam of light, indicated by an arrow 14, from the lamp passes.

A mirror 15 is provided to direct light towards the aperture 13. A lens 16 is shown in the path of the light rays from the lamp to concentrate the light on the sample under test.

In the path of this beam between the lamp 1 and the specimen to be described is an ultraviolet light filter 19 of conventional form such as for example an OX7 or OX9 filter manufactured by Chance-Pilkington Limited. This filter is shown on the outside of the housing 6 but it may be in the housing 1. The pulsating filtered light beam 17 from the aperture is directed in the direction shown by the arrow marked 17.

Figure 3:
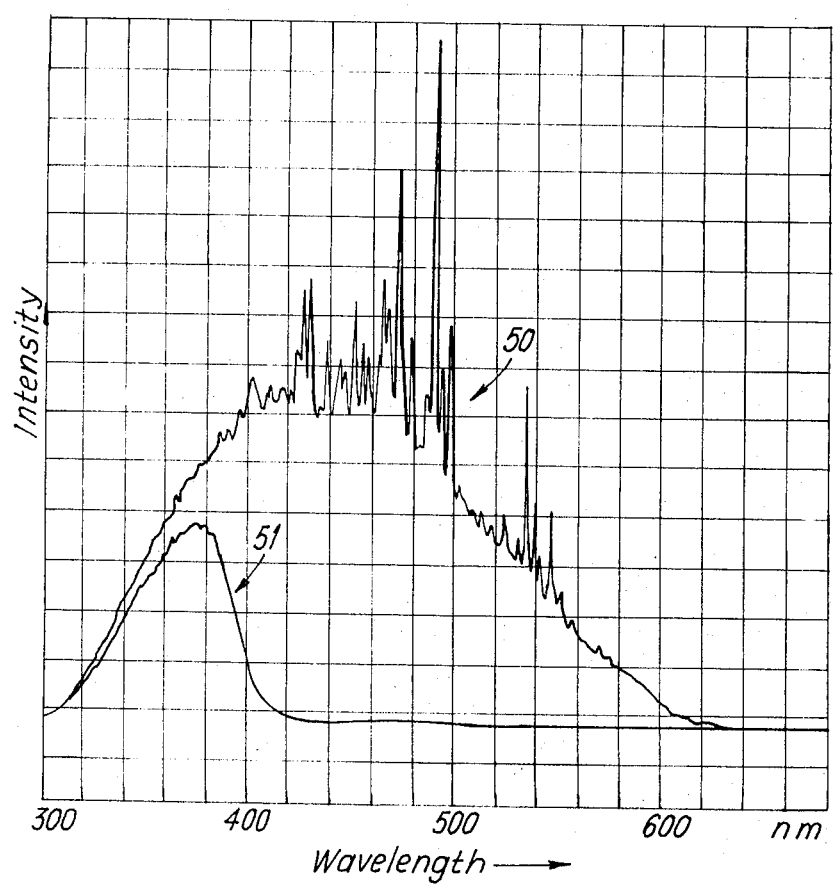
FIG. 3 shows the output spectrum of a light source used in one embodiment of the present invention.

The light source used in FIG. 1 may comprise a 200 Joule xenon filled flash lamp capable of being fired between 96 and 3,600 flashes per minute. One example of a suitable flash lamp is type MFT-151M manufactured by Elevam Company of Japan. The lamp is preferably operated at at least 2,000 flashes per minute and at such a level of energisation so that the sample is illuminated by a very rapid succession of short duration flashes having high peak intensity. The output wavelength characteristic of the light from the source is shown by the curve 50 in FIG. 3. As is shown, the lamp provides a substantial output intensity over a continuous range of wavelengths from about 300 nanometers up to about 600 nanometers. This provides a substantial intensity over the ultra violet range of 300 to 400 nanometers. When the filter 19 shown in FIG. 1 is an OX9 filter, the wavelength/intensity curve for the light transmitted to the sample is shown by the curve 51 in FIG. 3. This permits transmission of light from the lamp in the range 300 to 400 nanometers.

Figure 4:
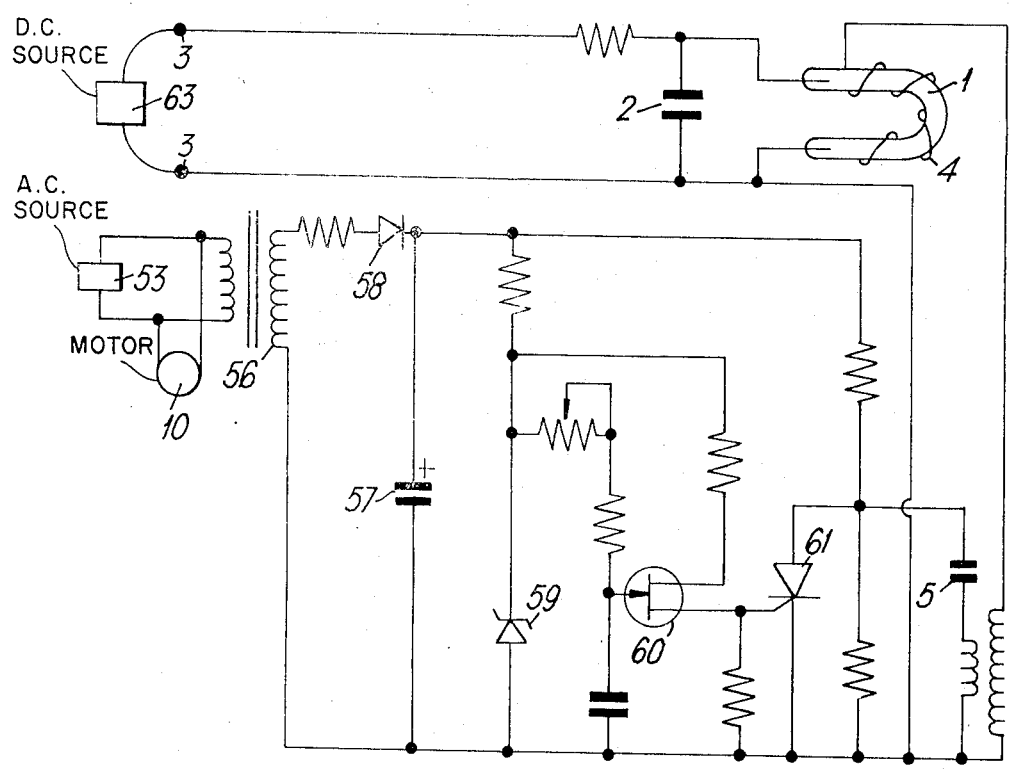
FIG. 4 shows in more detail the electrical circuit used for operating the light source in FIG. 1.

The electrical circuit for operating the lamp in FIG. 1 is shown in more detail in FIG. 4 and the same reference numerals have been used as in FIG. 1. The terminals 3 are connected to a 500 volt D.C. source 63. An A.C. source 53 drives the motor 10 and feeds a transformer 54 having a secondary winding 56. The winding 56 charges a capacitor 57 through a diode 58. A Zener diode 59 is connected across the capacitor 57 and breaks down when the voltage on the capacitor 57 reaches a predetermined value. When the Zener diode 59 breaks down, this switches unijunction transistor 60 which in turn operates a thyristor 61. The thyristor controls discharging of the capacitor 5 which thereby provides pulses on the trigger coil 4 of the lamp 1 in order to control the frequency of flashning of the lamp 1.

In the path of the beam 17 is a specimen holder 20. In this example the specimen 94 is an elongated rectangular piece of PERSPEX in which the sample in solid phase of the material to be tested is dispersed preferably homogeneously. Other shapes may be used and any suitable holder such as a quartz cell may be used if the specimen is a gas or a liquid. The holder is in the form of a base fixed to the frame supporting the whole apparatus with upstanding walls into which the specimen is a sliding fit to locate it firmly so that the major portion of its length is above the holder in the light beam 17. Thus when the lamp 1 is energised the pulsed beam 17 impinges on the specimen in the holder and the specimen emits luminescence characteristic of the specimen: for example a light blue for anthracene, green for ovalene or orange red for rhodamine B and so on.

Attached to the holder is a closed duct or tunnel 21 the other end of which is light-excludingly sealed to the casing 22 at an aperture 22a therein. The casing houses a light detector in the form of a photomultiplier 24.

The photomultiplier is of conventional construction and has a light-detecting photocathode 25 in an envelope 24 which is responsive to the light directed onto it from the specimen 5. Depending on the characteristic specimen light emission and the spectral response of the light detector the photomultiplier emits an electrical signal in the conventional manner the amplitude of which is a function of the intensity of light received. The frequency is dependent on the flashing rate of the lamp.

The casing 22 has an internal wall 18 in which is an aperture 23 in the path of the light passing through the aperture 22a to the device 25. The two apertures are for example vertical strips 2 mm wide.

A continuous interference filter 34 (which may for example be a type S60 manufactured by Jenaer Glaswerk Schott) is mounted in the space between the wall 18 and the apertured outer casing wall 18a and has a toothed rack 36 (FIG. 2) on its underside meshing with a gear driven through meshing gears 26 mounted in bearings fixed with respect to the casing, the lower gear in FIG 1 being driven as by the motor 26a also fixed with respect to the casing. By energising the motor the filter can be moved across the apertures 22a, 23 between fixed micro-switches 26b which at each end of the filter movement operate to break the motor circuit. It can thus be moved back and forth under control of the operator. The filter 34 (FIG. 2) is a plate transparent at predetermined wavelengths e.g. glass or quartz mounted in a frame 35 with the toothed rack and has a horizontal linear scale 37 showing the distance the filter has traversed from one of its ends across the specimen light-rays. The plate has vertical colour bands 38 of the spectrum and these changes from one to another colour across the plate as in a natural spectrum. As the filter traverses the specimen light rays the filtered light reaching the device 25 will change in wavelength and when the colour which is characteristic of the wavelength of the luminescence emitted corresponds with the wavelength transmitted by the filter 33 the maximum output signal will be emitted by the device 28 giving the peak 29 in the graph as shown for the oscillograph 28 of FIG. 1 and corresponding to the known wavelengths dependent on the particular filter employed. The two slits 22a and 23 are aligned on opposite sides of the filter and limit the path width of the luminescence transmitted through the filter.

The filter plate 33 has clear end bands 39, 40 which at clearly defined instants allow all light rays from the specimen to pass so that there is a graph between accurately defined linear points 41 and 42 at the ends of the scale 37 and thus from this scale the wavelength of the specimen light rays is displayed directly.

The signal from the photomultiplier may be transmitted to a suitable meter 27 which due to its response time does not show fluctuation due to flashing of the light source. The meter indicates the luminescence intensity at a particular wavelength. Alternatively the signal may be transmitted to a suitable conventional chart recorder 30 having for example a rotary drum with a roll of chart paper thereon and a stylus which produces a typical graphical representation of the signal in any desired manner indicative of the wavelength of the light. Another recording device is shown as the oscillograph 28. On this oscillograph the curve of filter displacement against luminescence is recorded and this has a peak 29 where the wavelength of the luminescence of the specimen corresponds to the wavelength transmitted by the filter.

Figure 5:
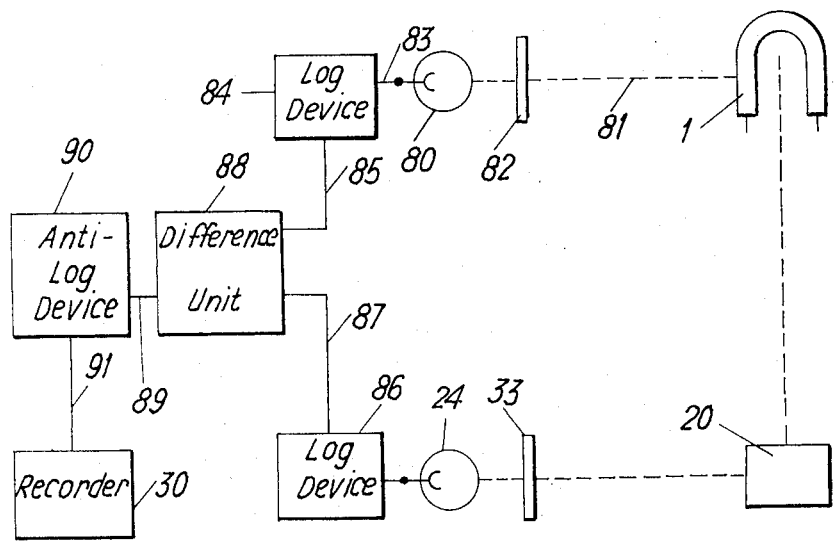
FIG. 5 shows an arrangement for compensating for variations in the output intensity of the light source used in FIG. 1.

The lamp 1 provides a substantially constant output intensity with time. However, some fluctuations may occur and means may be provided to avoid erroneous output signals being fed to the recorder 30 in this case. FIG. 5 shows such an arrangement. A second light detector 80, which may be similar to the photomultiplier 24, is positioned to receive light along a path 81 from the lamp 1. An adjustable attenuator 82 is provided in the path 81 so as to achieve a suitable output signal level from the detector 80. The output from detector 80 is fed along line 83 to a unit 84 which provides on output line 85 a signal representing the logarithm of the output from the detector 80. Similarly the output of the detector 24 is fed to a unit 86 which provides on line 87 a signal representing the logarithm of the output from the detector 24. The two lines 85 and 87 provide inputs to a difference unit 88 which feeds along line 89 a signal proportional to the difference of the two input signals. Line 89 is connected to device 90 which provides on the output line 91 the antilog of the signal on line 89. This antilog signal is proportional to the ratio of the two signals from the detectors 80 and 24 and is fed to the recorder 30. In this way, the signal recorded by the recorder is independent of fluctuations in the output intensity of the lamp 1.

Figure 2:
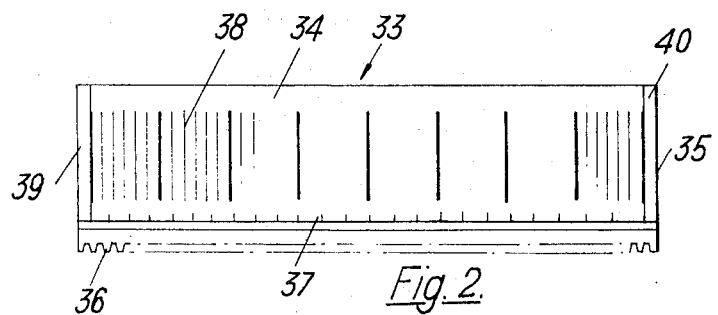
FIG. 2 shows diagrammatically a continuous spectral colour filter for use in the apparatus of FIG. 1.
Figure 6:
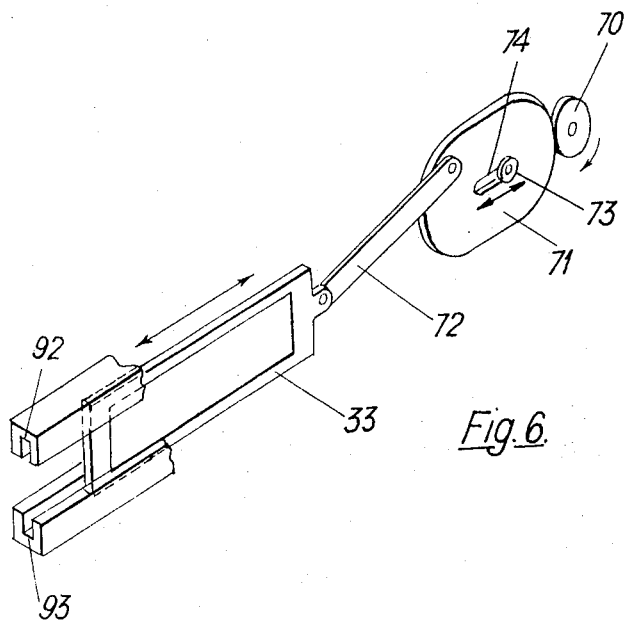
FIG. 6 shows a device which may be used with apparatus of the type shown in FIG. 1 to compensate for any non linearity in the wavelength transmission of the filter used.

The continuous interference filter 33 which is used may have a variation of transmitted wavelength from about 390 nanometers to 700 nanometers. As earlier noted the plate has vertical colour bands 38 of the spectrum and these change from one to another colour across the plate as in a natural spectrum. It will thus be appreciated that the filter provides a stepless variation in wavelength transmission. As such, the filter provides for wavelength selectivity enabling analysis of the intensity of emitted radiation at different wavelengths. The wavelength variation along the length of the filter is preferably substantially linear. There are however difficulties in making such filters with accurate linearity along their length. Any non linearity may however be compensated by providing a variable drive coupling between the filter and the motor arranged to drive it. Such an arrangement is shown in FIG. 6. In this case, the filter 33 is connected by a rod 72 to a rotatable cam 71. The periphery of the cam 71 is frictionally engaged by a wheel 70 driven by the gear wheel 26, in FIG. 1. The cam 71 is pivotally mounted on a pin 73 slidable in a slot 74 in the cam 71. The periphery of the cam 71 is so shaped as to alter the speed of movement of the filter 33 as the wheel 70 rotates and thereby compensate for any non linearity in the filter 33. In the arrangement shown in FIG. 6, the filter is arranged to slide horizontally between upper and lower channel members 92 and 93 and the rack 36 shown in FIG. 2 is not provided.

A wavelength dial may be provided on the circular face of one of the gears 26 while a fixed datum point is provided adjacent the dial to indicate the particular colour of wavelength band in the path of the light passing the apertures 22a, 23.

The ultraviolet filter 19 may itself be a continuous interference filter covering a range of ultraviolet wavelengths so that the ultraviolet wavelengths used to illuminate the specimen under test may be varied by adjustment of the position of the filter relative to the beam 17.

It can thus be seen that by means of the invention the luminescence of the specimen can be analysed quickly and automatically with a simple apparatus which is convenient to operate, is small in size and inexpensive to make. Various characteristics of the luminescence can be measured for example the fluorescence by the wavelength of the specimen light rays and the phosphorescence by the duration of the colouration after the lamp 1 has been switched off. It is possible for all such data to be recorded on the one graph thus giving rapid analysis of the desired characteristics of the specimen as well as the material of the specimen itself.

It will be appreciated that by using a pulsed light source it is possible to achieve very high intensity of illumination of the sample at the peaks of the illumination. As the peaks are of only short duration, the samples are not harmed by the high level of illumination. On the other hand, the peak illumination is of sufficient intensity to achieve the accurate results even with specimens which are weakly luminescent. Furthermore, the use of a continuous interference filter to analyse the light emitted by the sample under test enables good spectral resolution to be achieved from the output signals of the photomultiplier 24.

I claim:

1. Apparatus for identifying in terms of an electrical output the wavelength of the luminescence emitted by a luminescent sample under exciting radiation by analysing the intensity of emitted radiation at different wavelengths, said apparatus comprising a sample station whereat a sample may be supported at a predetermined location, a plasma discharge flash lamp for producing exciting radiation flashes of high peak intensity over a continuous range of wavelengths in a luminescence exciting region, an electrical supply circuit including a capacitor for storing electrical energy and discharging through said lamp with a high repetition rate, means for defining the path boundary of a beam of light directed in operation from the lamp to the sample under test, a transducer arranged to receive the luminescence emitted from the sample in a direction not included in said boundary at the substantial exclusion of direct rays from the lamp, said transducer being capable of providing an electrical output related to the intensity of the luminescence falling thereon, and a continuous filtering arrangement including wavelength selective interference filter means, providing over its area a stepless variation in wavelength transmission over a predetermined range and mounted for movement past the transducer, for varying the wavelength of said luminescence to enable said transducer to provide an electrical output related to intensity of said luminescence at different wavelengths, said filter means enabling the wavelength of the luminescence to be identified in terms of the electrical output of the transducer as the successive portions of the continuous filter corresponding to successive wavelengths in said predetermined range are scanned past the transducer.

2. Apparatus for detecting the intensity of luminescence at various wavelengths emitted by sample under test, which apparatus comprises a support for a sample under test, a plasma discharge flash lamp coupled to an electrical supply circuit including means for alternately storing and discharging rapidly stored electrical energy to produce flashes of high peak intensity over a continuous range of wavelengths in a required wavelength region, means for confining a beam of light from the lamp towards the sample under test, a light detector arranged to detect luminescence emitted from the sample and not the rays illuminating the sample and provide an electrical output signal dependent on the intensity of luminescence detected, and a continuous interference filter device located between the light detector and the sample, the filter device including wavelength selective filter plate means with stepless variation in wavelength transmission together with means for restricting the path width of luminescence transmitted by the filter, said filter plate means being movable across the path of luminescence so as to vary the wavelength which may be transmitted from the sample to the detector to enable said light detector to detect the intensity of said luminescence at different wavelengths.

3. Apparatus as claimed in claim 2, in which the lamp is arranged to provide a continuous spectrum in the range of at least 200 to 400 nanometers.

4. Apparatus as claimed in claim 2, in which the lamp is filled with inert gas.

5. Apparatus as claimed in claim 2, in which the continuous interference filter device plate means has an approximately linear varation of wavelength transmission along its length.

6. Apparatus as claimed in claim 5, including a constant speed motor for moving the filter.

7. Apparatus as claimed in claim 6, including a variable mechanical linkage, generating a linearising mechanical function, connected between the filter and the motor.

8. Apparatus as claimed in claim 2, in which means is provided for compensating for any fluctuations in the output intensity of the flash lamp.

9. Apparatus as claimed in claim 8, in which a second light detector is arranged to detect light from the lamp and provide an electrical signal dependent on the output intensity, means also being provided to receive the electrical output signals from the two light detectors and provide a signal representing the ratio of the two signals.

10. Apparatus as claimed in claim 2, in which the light detector is arranged to sense luminescence emitted from the sample in a direction substantially normal to the direction of the beam from the lamp to the sample.

* * * * *